O. M. RICE.
STENCH-TRAPS.

No. 193,831. Patented Aug. 7, 1877.

Witnesses:

Inventor:

UNITED STATES PATENT OFFICE.

OBED M. RICE, OF ROCHESTER, NEW YORK, ASSIGNOR TO ERASMUS D. SMITH, JR., AND SARAH M. RICE, OF SAME PLACE.

IMPROVEMENT IN STENCH-TRAPS.

Specification forming part of Letters Patent No. 193,831, dated August 7, 1877; application filed June 28, 1877.

*To all whom it may concern:*

Be it known that I, OBED M. RICE, of the city of Rochester, county of Monroe, State of New York, have invented a new Device for Stench-Trap to prevent noxious gases escaping from sewers and cess-pools; and I hereby declare that the following is a full and correct description thereof, reference being had to the accompanying drawings, and the letters of reference marked on said drawings.

The nature of my invention consists in combining a vertical pipe, which is cut off obliquely at its lower end, with a swinging valve, for closing the opening in said pipe, said valve being hinged upon the pipe by arms at its sides, so arranged that the valve will open easily and close perfectly by its weight, as shown upon drawings marked Figures 1 and 2.

Figure 1:
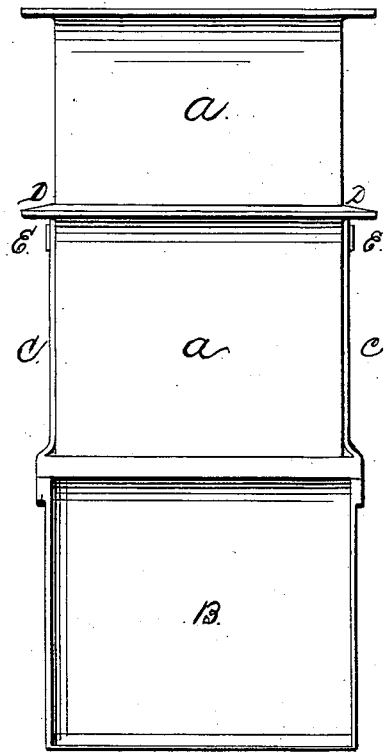
Fig. 1 represents the face of said pipe $a$ with the valve B closed, and flanges D and arms $c$ attached to pipe $a$ by journal E and valve B.
Figure 2:
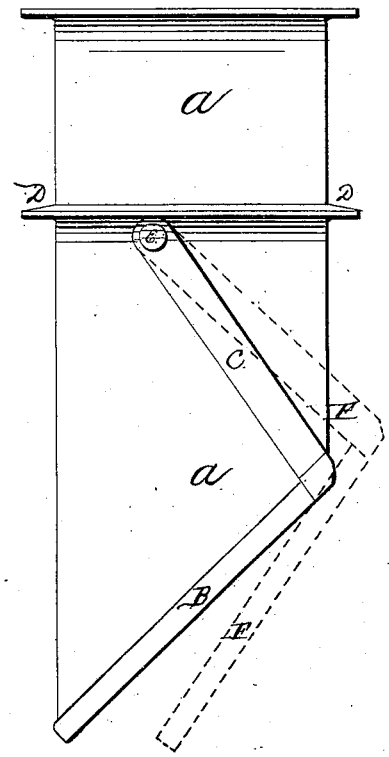
Fig. 2 represents a side view of a truncated pipe, $a$, with the valve B closed, and the arms $c$ attached to pipe $a$ by journal E and valve B, together with the flange D.

The dotted lines F represent the valve B when open, also arms $c$. The valve B shuts up against instead of down upon the pipe $a$.

The flanges D are to protect the arms $c$ from any dirt or gravel accumulating, which would affect their perfect operation, and also to support pipe $a$ in the wall.

The journal E is so located upon pipe $a$ as to allow arms $c$ to cause valve B to open by water in small quantities flowing into pipe $a$, and valve B again closing by its own weight.

What I claim, and desire to secure Letters Patent for, is—

1. The combination of the obliquely-truncated pipe $a$, the valve B, and the arms $c$, substantially as described.

2. The combination of the pipe $a$, provided with flanges D, and the flap-valve B, supported by arms $c$ $c$ on opposite sides of the pipe, substantially as and for the purposes set forth.

OBED M. RICE.

Witnesses:
 C. C. DAVISON,
 J. AARON ADAMS.